United States Patent Office 2,836,492
Patented May 27, 1958

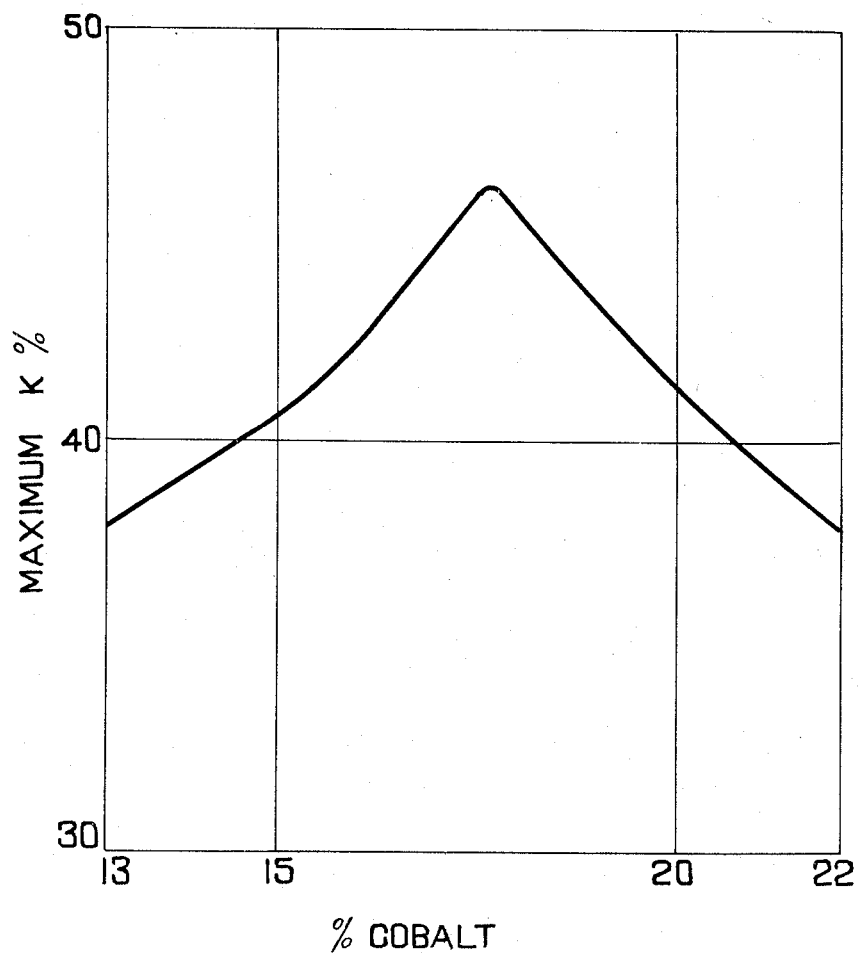

2,836,492
NICKEL-COBALT ALLOY MAGNETOSTRICTIVE ELEMENT

Charles Alfred Clark, Edgbaston, Birmingham, England, assignor to The International Nickel Company, Inc., New York, N. Y., a corporation of Delaware Application December 20, 1955, Serial No. 554,295

Claims priority, application Great Britain December 23, 1954

7 Claims. (Cl. 75—170)

The present invention relates to an improved magnetostrictive element and, more particularly, to an improved transducer for converting mechanical energy into electrical energy or vice versa and having a magnetostrictive element made of a special nickel-cobalt alloy.

Magnetostrictive devices are used for the conversion of electrical energy to mechanical energy or vice versa, for example, as transducers in echo-sounding apparatus and ultrasonic drilling apparatus. It is well known that these magnetostrictive devices or transducers may comprise a vibrator element made of a material exhibiting good magnetostrictive properties in a varying magnetic field. A vibrator element is described herein by way of example but the element may be used in a non-vibrating condition. For example, such a transducer may have a vibrator in the form of a core comprising a magnetostrictive material around which there may be wound a coil through which an alternating current is caused to flow. By virtue of the magnetostrictive properties of the core material, this results in mechanical vibrations of the core. The core or vibrator can also be called the "magnetostrictive element" and the combination of the core and the windings, together with any associated means of producing a steady biasing magnetic field in the region of the core, is the transducer or "magnetostrictive device." The transducer functions by the conversion of electrical to mechanical energy or vice versa. These devices may be polarized with a steady field in a suitable manner and means may be provided for superimposing an alternating exciting field on the steady polarized field (see, for example, the article by H. J. Round in "Wireless Engineer," vol. XXIX, 1952, pages 101 to 105, inclusive).

A measure of the efficiency of the magnetostrictive device is given by its electromechanical coupling coefficient "K," which is a measure of the efficiency of the magnetic material in converting magnetic to mechanical energy. The electromechanical coupling coefficient "K" is such that $$K^2 = \frac{\text{converted mechanical stored energy}}{\text{input magnetic stored energy}}$$

The coefficient "K" is usually expressed as a percentage. Its value depends upon the material of the magnetostrictive element.

The value of the coefficient "K" may be determined experimentally, for example, by the procedure outlined in the aforementioned article by H. J. Round. The impedance of the winding varies with the frequency of the alternating current supplied and has a minimum at the fundamental frequency of oscillation "fo" of the magnetostrictive element. It is found that the impedance is purely resistive at the resonance frequency "fo" and also at two other frequencies greater and less than "fo" by an amount "Δ." The coefficient "K" can be shown to be given by the expression:

$$K = \frac{2\Delta}{\sqrt{fo^2 + 4\Delta^2}}$$

and can thus be determined experimentally. The coefficient "K" can thus be determined experimentally by measurements of "fo" and "Δ" (see particularly pages 104 and 105 of the aforementioned article by H. J. Round).

The material commonly used for magnetostrictive elements is commercially pure nickel, which combines a high electromechanical coupling coefficient in magnetic fields of low and medium strength with high resistance to corrosion.

The present invention is based on the discovery that the addition of a substantial amount of cobalt to the nickel improves the coupling coefficient at low and medium field strengths, that is to say, at field strengths insufficient to bring the magnetic core or magnetostrictive element into a condition of magnetic saturation.

It is an object of the present invention to provide a transducer for converting mechanical energy into electrical energy or vice versa having a special magnetostrictive element having a high electromechanical coupling coefficient.

Another object of the invention is to provide an echo-sounding apparatus having a transducer for converting mechanical energy into electrical energy or vice versa and provided with a special magnetostrictive element having a high electromechanical coupling coefficient.

The invention also contemplates providing an ultrasonic drilling apparatus including a transducer for converting mechanical energy into electrical energy or vice versa and provided with a special magnetostrictive element having a high electromechanical coupling coefficient.

It is a further object of the invention to provide a magnetostrictive element having a high electromechanical coupling coefficient.

The invention further contemplates providing a transducer element exhibiting good magnetostrictive properties and providing both a higher electromechanical coupling coefficient and a higher Curie temperature than pure nickel.

Other objects and advantages will become apparent from the accompanying drawing in which the figure is a curve showing the variation of the electromechanical coupling coefficeint "K" with the cobalt content of the nickel-cobalt alloys.

Generally speaking, the present invention contemplates providing in an apparatus, such as echo-sounding apparatus or an ultrasonic drilling apparatus, a transducer having a magnetostrictive element made of a binary alloy of nickel and cobalt containing from about 15% to about 20.5% and preferably about 16.8% to about 18.8% cobalt. In making the alloys commercially pure nickel is normally used and, accordingly, the usual impurities will also be present. Commercial nickel often contains small quantities of cobalt and in making the alloys it is necessary to allow for any cobalt present in the nickel.

The variation of the electromechanical coupling coefficient with cobalt content is shown in the curve in the accompanying drawing, in which the abscissae are the cobalt contents of nickel-cobalt alloys tested as laminations in a ring transducer, and the ordinates are the values of the coefficient "K" expressed as a percentage of unity. For each alloy tested the polarizing field was adjusted until the value of "K" obtained was a maximum for the alloy. Under these test conditions, pure nickel gave a "K" value of 31% and commercial nickel containing 1% cobalt gave a "K" value of 33%. At 15% cobalt, however, "K" had risen to about 40% and at about 18% cobalt to about 46%. As the cobalt content increased further the value of "K" began to fall again, being about 41% at 20% cobalt. This graph thus shows the critical nature of the cobalt content and of the advantage obtained by using binary nickel-cobalt alloys containing from 15% to 20.5% cobalt.

In certain transducers employing high powers, for example, in ultrasonic drills, it is necessary to circulate a continuous flow of cooling water round the transducer. One reason for this is that, since magnetic alloys lose their ferro-magnetic properties at temperatures above the Curie temperature, it is necessary to prevent excessive heating within the nickel transducer. A particular advantage of the present invention is that, because the addition of cobalt to nickel progressively increases the Curie temperature, the magnetostrictive elements according to the invention can withstand a greater degree of heating than nickel without their magnetic properties being seriously affected. For example, the Curie temperature of a cobalt-nickel alloy containing 18% cobalt is about 580° C., in contrast to 355° C. for nickel.

We have found that in a transducer of given size an improvement in the dynamic magnetostrictive properties leads to a slight drop in the resonant frequency. Thus, in one transducer operated at the optimum polarizing field the mechanical resonant frequency for nickel laminations is 34.2 kilocycles/second, whereas for laminations of an alloy of 18% cobalt and 82% nickel the resonant frequency is 33.6 kilocycles/second. Account must be taken of this in designing the transducer and determining the excitation frequency.

The foregoing tests results showing the maximum values for the electromechanical coupling coefficient for various nickel-cobalt alloys were obtained by testing nickel-cobalt alloys which were held to maximum impurity levels of 0.04% carbon, 0.03% silicon, 0.05% manganese, 0.01% sulfur and 0.5% iron. The alloys were deoxidized with magnesium and processed to 0.006 inch thick strip as far as possible according to the Standard Marconi schedule for nickel strip for echo sounders. The resulting half-hard strip was stamped into rings of outer diameter 5 cm. and inner diameter 4 cm. and these were then annealed in purified hydrogen for 1 hour at 750° C. The test cores were wound with induction and polarizing windings, each of 120 turns, the polarizing winding being connected through an ammeter and appropriate rheostats to a D. C. supply.

The induction winding in parallel with a variable condenser and in series with a suitable air-cored coil was connected in the unknown arm of an inductance bridge. The air-cored coil was included to ensure a substantially inductive impedance over the entire range of frequency required in the tests. A constant input current of 50 ma. was obtained from an oscillator and the capacitance was adjusted until the M-shaped resistance-frequency curve was symmetrical about the resonant-frequency, given by the minimum in the M-curve. The electromechanical coupling coefficient "K" for the alloy is then given by the aforementioned formula where "$f_o$" is the resonant frequency and $2\Delta$ is the frequency interval between the two maxima on the resistance-frequency curve.

The term "low and medium field strengths" as used in magnetism relates generally to the part of the magnetization curve. Low field strengths refer to the initial and reversible part of the magnetization curve. In annealed nickel and in the γ-phase nickel-cobalt alloys of this invention, this range extends from 0 to about 0.3 oersted. Medium field strengths extend from this reversible region up to technical saturation. In annealed nickel and the γ-phase nickel-cobalt alloys, the medium field strength would range from about 0.3 up to about 30 oersteds. High field strengths are those at which the magnetic material is technically saturated and in the alloys of interest extend from about 30 oersteds upwards. The precise range of field strength defined by the terms low and medium field strengths would depend to a considerable extent on the type of magnetic material. Thus, heavily cold worked nickel would probably require about 100 oersteds to attain saturation, pure cobalt requires about 20,000 oersteds to be saturated and magnetically annealed 65/35 nickel-iron alloys requires only about 0.05 oersted to achieve saturation.

The present invention is particularly applicable to magnetostrictive devices used in echo-sounding apparatus and in ultrasonic drilling apparatus, for example, in ultrasonic oil well drilling apparatus, and in soldering irons.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A magnetostrictive element made of a binary alloy consisting of nickel and cobalt containing from about 16.8% to about 18.8% cobalt whereby a magnetostrictive element is provided having high efficiency in the conversion of electrical energy into mechanical energy or vice versa at field strengths insufficient to bring the magnetostrictive element into a condition of magnetic saturation.

2. A magnetostrictive element made of a binary alloy consisting of nickel and cobalt containing from at least about 15% to less than 20% cobalt whereby a magnetostrictive element is provided having high efficiency in the conversion of electrical energy into mechanical energy or vice versa at field strengths insufficient to bring the magnetostrictive element into a condition of magnetic saturation.

3. In a transducer for converting mechanical energy into electrical energy or vice versa in an echo-sounding device, the improvement comprising a magnetostrictive element consisting essentially of a binary alloy consisting of nickel and cobalt containing from at least about 15% to less than 20% cobalt whereby an echo-sounding device is provided having high efficiency in the conversion of mechanical energy into electrical energy or vice versa at field strengths insufficient to bring the magnetostrictive element into a condition of magnetic saturation.

4. In a transducer for converting mechanical energy into electrical energy or vice versa in an ultrasonic drilling apparatus, the improvement comprising a magnetostrictive element consisting essentially of a binary alloy consisting of nickel and cobalt containing from at least about 15% to less than 20% cobalt whereby an ultrasonic drilling apparatus is provided having high efficiency in the conversion of electrical energy into mechanical energy or vice versa at field strengths insufficient to bring the magnetostrictive element into a condition of magnetic saturation.

5. In a transducer for converting mechanical energy into electrical energy or vice versa in a soldering iron, the improvement comprising a magnetostrictive element consisting essentially of a binary alloy consisting of nickel and cobalt containing from at least about 15% to less than 20% cobalt whereby a soldering iron is provided having high efficiency in the conversion of electrical energy into mechanical energy or vice versa at field strengths insufficient to bring the magnetostrictive element into a condition of magnetic saturation.

6. In a transducer for converting mechanical energy into electrical energy or vice versa, the improvement comprising a magnetostrictive element consisting essentially of an alloy of nickel and cobalt containing from about 16.8% to about 18.8% cobalt and the balance nickel except for impurities normally present in nickel and cobalt whereby a transducer is provided having high efficiency in the conversion of mechanical energy into electrical energy or vice versa at field strengths insufficient to bring the magnetostrictive element into a condition of magnetic saturation.

7. In a transducer for converting mechanical energy into electrical energy or vice versa, the improvement comprising a magnetostrictive element consisting essentially of an alloy of nickel and cobalt containing from at least about 15% to less than 20% cobalt and the balance nickel except for impurities normally present in nickel and cobalt whereby a transducer is provided having high efficiency in the conversion of mechanical energy into electrical energy or vice versa at field strengths insufficient to bring the magnetostrictive element into a condition of magnetic saturation.

References Cited in the file of this patent

UNITED STATES PATENTS

| | | |
|---|---|---|
| 1,954,102 | Roseby | Apr. 10, 1934 |
| 2,072,576 | Acker | Mar. 2, 1937 |
| 2,192,491 | Widell | Mar. 4, 1940 |

OTHER REFERENCES

Ferromagnetism, Bozorth D. Van Nostrand Co., Inc., New York, N. Y., 1951, pages 628, 629, 630 and 672–674.